United States Patent [19]

Ducos

[11] Patent Number: 4,573,790
[45] Date of Patent: Mar. 4, 1986

[54] AUTOMATIC DEVELOPER/PRINTER APPARATUS FOR OBTAINING PHOTOGRAPHIC PRINTS FROM A NEGATIVE

[75] Inventor: Michel Ducos, Ramonville St Agne, France

[73] Assignee: Sarl Photosysteme, Escalquens, France

[21] Appl. No.: 591,452

[22] Filed: Mar. 20, 1984

[30] Foreign Application Priority Data

Mar. 24, 1983 [FR] France ................. 83 05014

[51] Int. Cl.⁴ .......................................... G03B 29/00
[52] U.S. Cl. .......................................... 355/28; 355/75
[58] Field of Search ................. 355/27, 28, 75, 29

[56] References Cited

U.S. PATENT DOCUMENTS

| | | | |
|---|---|---|---|
| 2,294,992 | 9/1942 | Landrock et al. | 355/75 |
| 2,510,363 | 6/1950 | Anderson | 355/75 |
| 2,552,225 | 5/1951 | Simmons et al. | 355/75 |
| 2,927,503 | 3/1960 | Zollinger | 355/28 |
| 3,045,540 | 7/1962 | Caps et al. | 355/28 |
| 3,283,647 | 11/1966 | Fairbanks et al. | 355/28 |
| 4,184,763 | 1/1980 | Handsman et al. | 355/27 |
| 4,451,141 | 5/1984 | Thebault | 355/28 |

*Primary Examiner*—Monroe H. Hayes
*Attorney, Agent, or Firm*—Sandler & Greenblum

[57] ABSTRACT

An automatic developer/printer apparatus for obtaining photographic prints from a negative. The apparatus includes a projection assembly having therein: a light source, a projection chamber, a negative carrier, and an optical assembly. The apparatus also includes an exposure darkroom having therein at least one magazine of photosensitive material, a projection plane, a cutting element, and an advancement element. The apparatus further includes a developer having a plurality of treatment tanks and paper feed mechanisms, and a housing containing a drying chamber and a treatment product reservoir. The projection assembly is positioned parallel to the exposure darkroom which is itself positioned above the developer. The housing containing the drying chamber and the treatment product reservoir is positioned under the projection apparatus and adjacent to the developer.

26 Claims, 5 Drawing Figures

AUTOMATIC DEVELOPER/PRINTER APPARATUS FOR OBTAINING PHOTOGRAPHIC PRINTS FROM A NEGATIVE

BACKGROUND OF THE INVENTION

1. Field of the Invention

This invention relates to an automatic developer/printer apparatus for obtaining photographic prints from a negative.

2. Description of Pertinent Information

The method currently used to obtain photographic prints is to use an apparatus to expose a photosensitive material from a negative, to cut it, and to develop it by chemical means. Such apparatus are not designed to enlarge photographs from a single negative in a plurality of formats or sizes, however, and they are cumbersome to operate.

SUMMARY OF THE INVENTION

The present invention overcomes the above disadvantages by means of a developer/printer apparatus that automatically obtains, by positioning of constituent elements of the apparatus, photographic prints and enlargements from a negative in an easy and rapid manner.

The developer/printer apparatus according to the invention comprises a projection assembly provided with at least one light source, at least three subtractive filters, preferably motordriven, a negative carrier, an optical apparatus, and a projection chamber; a darkroom for exposing photosensitive materials comprising a projection plane, a cutting element, at least one magazine of photosensitive material in strip form, and at least one element that allows for advancement of the photosensitive material against and in front of the projection plane; a developer provided with a plurality of treatment tanks in which are positioned means for feeding exposed and cut paper through these tanks; and a housing comprising a drying chamber and a treatment product reservoir. The apparatus according to the invention further comprises the positioning of the projection assembly parallel to the darkroom such that the darkroom is positioned above the developer. The housing containing the drying chamber and the treatment product bath is located under the projection assembly and against the developer.

BRIEF DESCRIPTION OF THE DRAWINGS

Other advantages and characteristics will be evident from reading the following detailed description and by referring to the attached drawings by way of non-limiting examples in which.

DETAILED DESCRIPTION OF PREFERRED EMBODIMENTS

Figure 1:
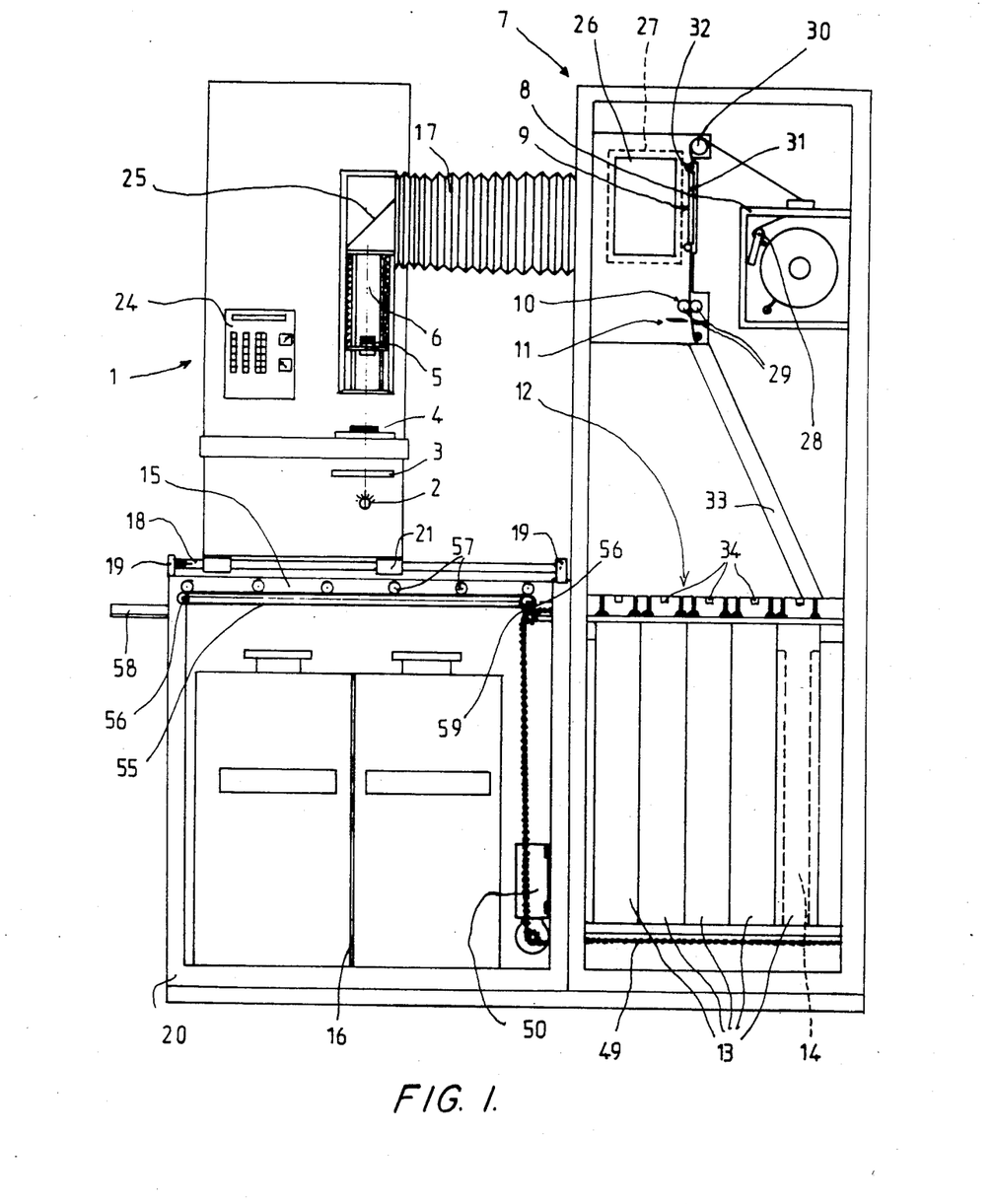
FIG. 1 is a front view of the developer/printer apparatus according to the invention.

The present invention relates to an automatic developer/printer apparatus for obtaining photographic prints from a negative as shown in FIG. 1. The developer/printer apparatus comprises a projection assembly 1 having at least one light source 2 positioned below at least three subtractive filters 3, preferably motor-driven, a negative carrier 4 in which developed film negatives move, an optical apparatus 5, and a projection chamber 6. The apparatus further comprises an exposure darkroom 7, provided with photosensitive material preferably in strip form loaded in a magazine 8, and a projection plane 9 perpendicular to the light projected through a negative from projection assembly 1 against which is fitted the photosensitive material.

Darkroom 7 also contains at least one cutting element 10 and at least one advancing element 11 for advancing the photosensitive material against and in front of projection plane 9. Developer 12 comprises a plurality of treatment tanks 13 in darkroom 7 in which are located paper feed means 14 into which cut photosensitive material is fed. The developer/printer apparatus additionally comprises a drying chamber 15 and a treatment product reservoir 16 contained in a housing 20.

Projection assembly 1 is positioned parallel and adjacent to exposure darkroom 7, with darkroom 7 positioned above developer 12, and housing 20 containing drying chamber 15 and treatment product reservoir 16 is positioned under projection apparatus 1 and against developer 12. Through this arrangement the apparatus is easy to use and is very compact.

Projection assembly 1 is movably mounted to darkroom 7 perpendicular to projection plane 9 of darkroom 7 on the housing. Optical apparatus 5 is movably mounted to projection assembly 1 perpendicular to the horizontal plane of negative carrier 4 and is adapted to more synchronously with projection assembly 1 so that as projection assembly 1 is repositioned, optical apparatus 5 likewise repositions automatically. This arrangement allows negatives to be enlarged and ensures that light projected through a negative is focused and projected onto projection plane 9.

Figure 2:
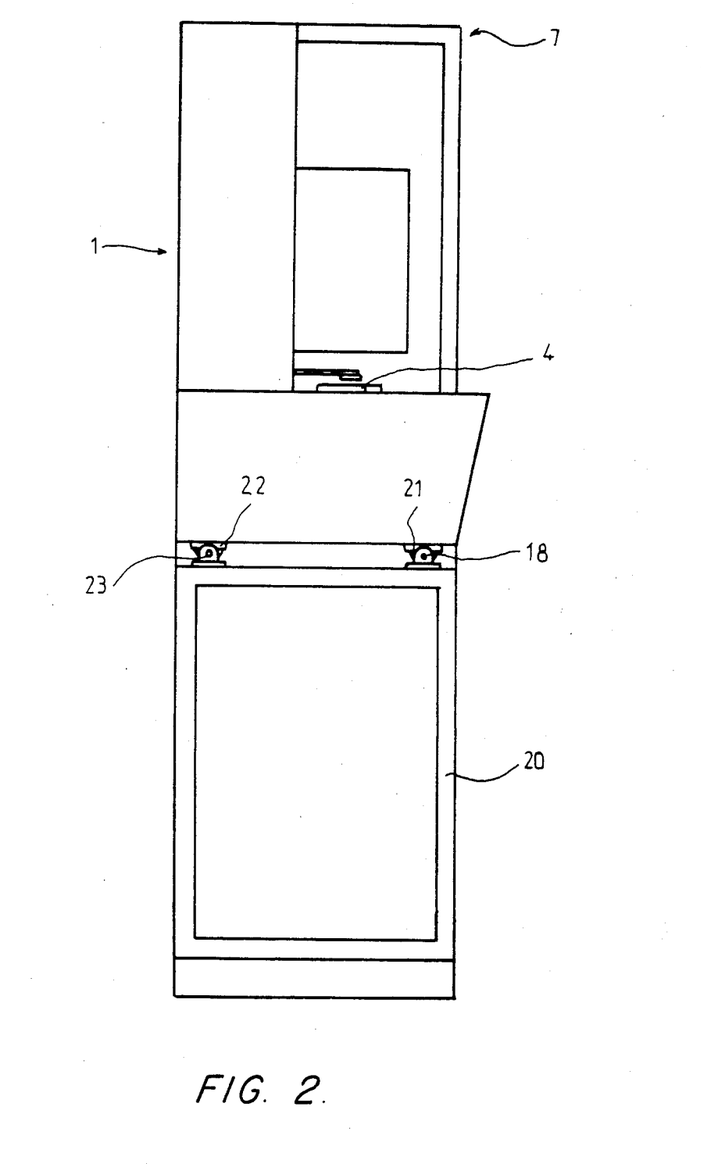
FIG. 2 is a side view of the apparatus according to the invention.

Projection assembly 1 is connected to darkroom 7 by a bellows 17 through which is projected light projected through a negative. Bellows 17 permits projection assembly 1 to move in a horizontal plane with respect to projection plane 9 of the darkroom. The horizontal plane passes through negative carrier 4 that is positioned in projection assembly 1 perpendicular to projection plane 9 of darkroom 7 and parallel to the displacement of projection assembly 1 on housing 20. Horizontal displacement of the projection assembly is effected by means of a lead screw 18 rotationally guided in bearings 19 integral with housing 20 that contains treatment product reservoir 16 and drying chamber 15. Lead screw 18 cooperates with projection assembly 1 by means of screws 21 attached laterally under the projection assembly. A roller or slide surface 22 guided by a slide path 23 integral with housing 20 and parallel to the axis of lead screw 18 (FIG. 2) permits movement in the horizontal plane.

Optical apparatus 5 is movably mounted perpendicular to the direction of displacement of projection assembly 1. Displacement occurs automatically through action of a cam to ensure that light projected through a negative is focused and projected in darkroom 7. Optical apparatus 5 moves vertically above negative carrier 4 as a function of the enlargement ratio desired and occurs synchronously with the displacement of projection assembly 1. Synchronous displacement is governed by lead screw 18, which is preferably motor-driven.

According to a preferred embodiment, synchronicity of displacement is controlled by a microprocessor, which, as a function of the enlargement ratio displayed on panel 24 and preferably positioned on projection assembly 1, calculates the displacement that projection assembly 1 must effect, which in turn governs the position and height of optical apparatus 5 as a function of the displayed enlargement ratio.

Reflection mirror 25 inclined at a 45° angle with respect to the horizontal plane of the negative carrier in projection chamber 6 is interposed between optical apparatus 5 and bellows 17 to reflect the light projected through the negative and optical apparatus through bellows 17 to projection plane 9 of darkroom 7. Mirror 25 must be positioned manually when the position and height of optical apparatus 5 is adjusted, and must be positioned at a distance from negative carrier 4 to permit enlargements. Negative carrier 4 preferably is mounted rotatably under optical apparatus 5 thus permitting at least two enlargement formats on the photosensitive material strip of a predetermined width. For example, negative carrier 4 can provide enlargement formats such as 330 mm×460 mm (13"×18") and 460 mm×610 mm (18"×24") by simply rotating the image 90° with respect to the paper used and by displacing projection assembly 1 and optical apparatus 5 as a function of the desired enlargement ratio.

Optical apparatus 5 preferably is movable, and projection assembly 1 is adapted to accept at least three types of lenses corresponding to three negative formats. The apparatus according to the invention thus makes it possible to obtain a large number of enlargement formats for different types of negatives. Advancement of the negative, preferably manually, is effected by any means known to one skilled in the art. It is obvious also that advancement of the negative can be controlled automatically by a microprocessor. Displacement of projection assembly 1 and optical apparatus 5 also can be obtained manually by known means, e.g., by a handle, rack, or other, so as to enlarge and focus an image formed by light projected through a negative onto projection plane 9 in exposure darkroom 7.

The darkroom preferably is provided with means for verifying the enlargement format and the focus of the light projected through a negative on projection plane 9. Verification means comprises at least one frosted glass 26 positioned on one of the lateral surfaces of darkroom 7 so as to be visible by the user, and by at least one pivotable mirror 27 mounted in the darkroom. The pivot axis of mirror 27 is vertical, and the mirror can be positioned manually from the exterior of the darkroom by a handle or by any known automatic means from panel 24, such as, for example, by an electromagnet. Mirror 27 is pressed against frosted glass 26 during exposure of the photosensitive material to the light projected through a negative from the projection assembly, thus ensuring that no stray light enters the darkroom. During verification, this mirror can be interposed on the projected light in a manner so as to reflect the light on frosted glass 26 preferably at a 45° angle. A stop abutment makes it possible to correctly align mirror 27. The light image obtained on mirror 27 is the reverse of the negative, but will be the same size as that to be exposed on the photosensitive material. This reflection makes it possible to easily modify the enlargement by having a real view of the dimensions of the final product.

The light exposes a photosensitive material such as paper bearing a photosensitive emulsion on photosensitive surfaces. The paper is the form of a roll and is stored in magazine 8 of darkroom 7. The magazine is of sufficiently large width so as to accept a roll of paper corresponding to the maximum width of the enlargements desired. The paper roll is easily interchangeable and is maintained in the magazine by any known means allowing for its free rotation. Magazine 8 protects the photosensitive paper roll from stray light.

Magazine 8 preferably comprises a braking and tensioning system 28 preventing any undesired unwinding of the paper roll due to inertia. This magazine is positioned in the rear portion of darkroom 7 behind projection plane 9. Paper preferably is fed out of the upper portion of magazine 8 and directed above projection plane 9. The paper is then vertically oriented by roller 30. Paper advancement means 10 are positioned below projection plane 9 and comprise at least two horizontal rollers 29, parallel to the axis of the paper roll, and in contact with one another. Rollers 29 make it possible to tension the paper in front of projection plane 9 and to advance this paper after each exposure. The paper is maintained taut in front of and against projection plane 9 by means of rollers 29 and 30 so that the paper does not deform. A vertical plate 31 positioned between two horizontal cylinders 32 guides the movement of the strip of paper when it is advanced. Paper passing in front of plate 31 and behind cylinders 32 is stretched and maintained against plate 31 during advancement of the paper between cylinders 32. After exposure, paper is advanced by a length equal to the height of the exposure imparted on the paper. The paper is then cut by at least one cutting element 10 positioned behind paper advancement rollers 29.

Cutting element 10 comprises a known apparatus such as a fixed blade and a movable blade, preferably activated electrically as a function of the advancement of the paper. According to the preferred embodiment, cutting and advancement of the paper are controlled by a microprocessor that calculates, as a function of the enlargement ratio displayed on panel 24, the advancement length and the cutting of the paper once the calculated length has been advanced. The exposed paper, after being cut, falls by gravity into developer 12 positioned under darkroom 7. It is guided through its fall by spout 33.

Spout 33 preferably moves in a horizontal plane with respect to developer 12 allowing for the distribution of paper at different points across the width of developer 12. Production of the apparatus can be increased by increasing the pace of advancing, exposing, and cutting of the paper. Horizontal displacement of spout 33 is obtained by any means known to one skilled in the art, and the speed of displacement can be controlled by a microprocessor as a function of the advancement of the paper.

Developer 12 comprises a plurality of tanks 13, preferably of the same height, containing treatment products necessary for developing, such as developer, fixer, water, and other compounds. Tanks 13 are each provided with at least one aperture 34 centered over an axis formed by the vertical walls separating the tanks between side walls of the tanks. Aperture 34 serves as an entryway to the paper feed means 14 fixed in each tank. Paper feed means 14 comprises rollers 35 rotatable on shafts 36 (FIG. 4) guided in bearings provided in parallel side plates 37 and 38. Rollers 35 are evenly spaced parallel to each other in a vertical plane and are all of the same length and diameter. Paper feed means 14 further comprises a plurality of parallel endless belts 39 (FIG. 3) mounted between two shafts 40 guided in bearings provided in side plates 37 and 38. These belts run in evenly spaced grooves in shaft 40 and are adapted to be displaced linearly with respect to rollers 35. Shafts 40 are parallel to the axis of rollers 35 and are positioned respectively above first roller 35 and below the last. Upper shaft 40 preferably is mechanically driven. Belts 39 operate perpendicular to the axes of rotation of rollers 35 and 40 and are in contact with rollers 35 and pressed there against by cylindrical rods 41 loosely mounted in bearings provided in side plates 37 and 38 parallel to the axis of rotation of the rollers and positioned in the median portion of the space separating rollers 35 and 40.

Figure 3:
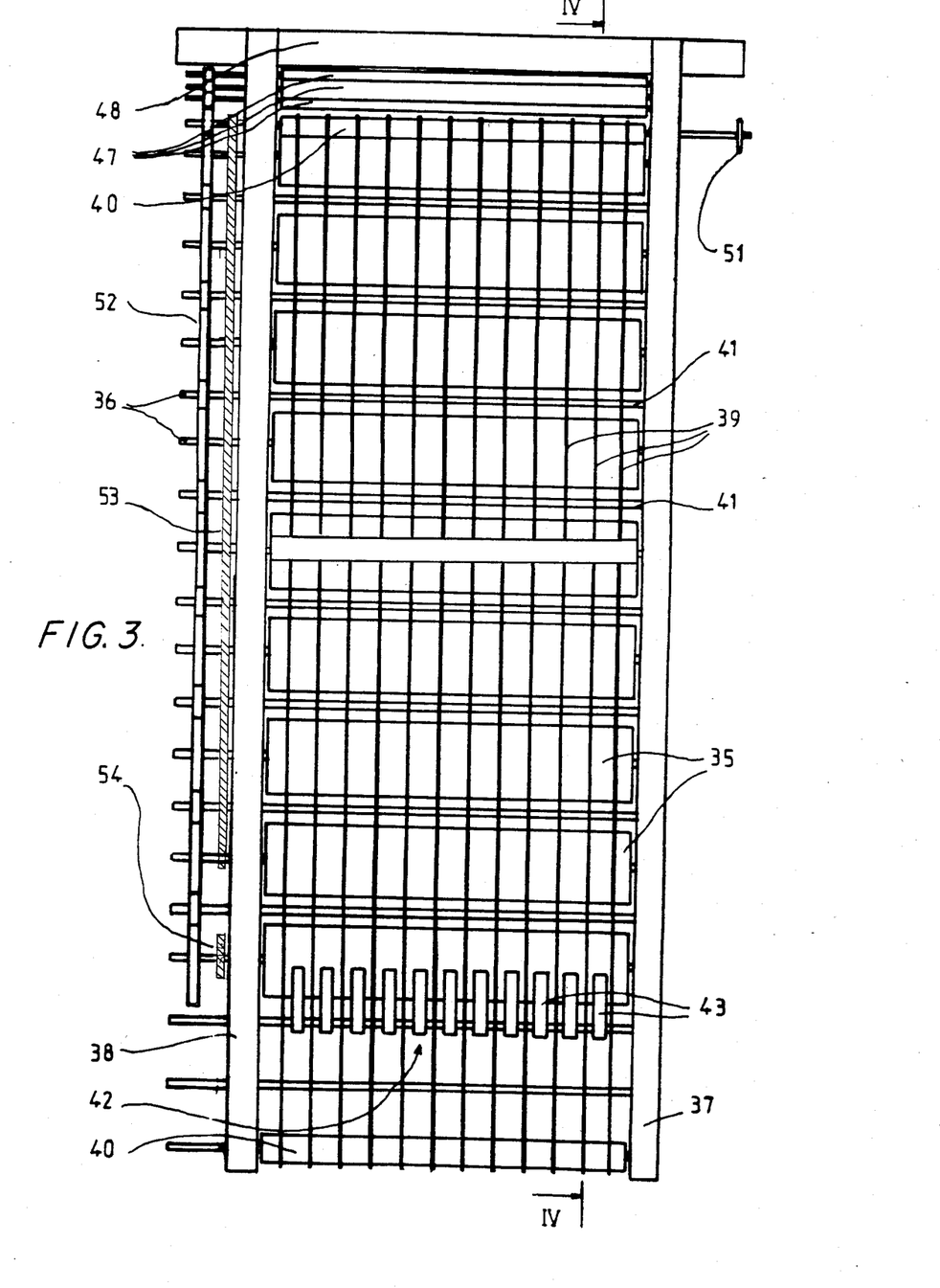
FIG. 3 is a front view of the feed element of the developer.
Figure 4:
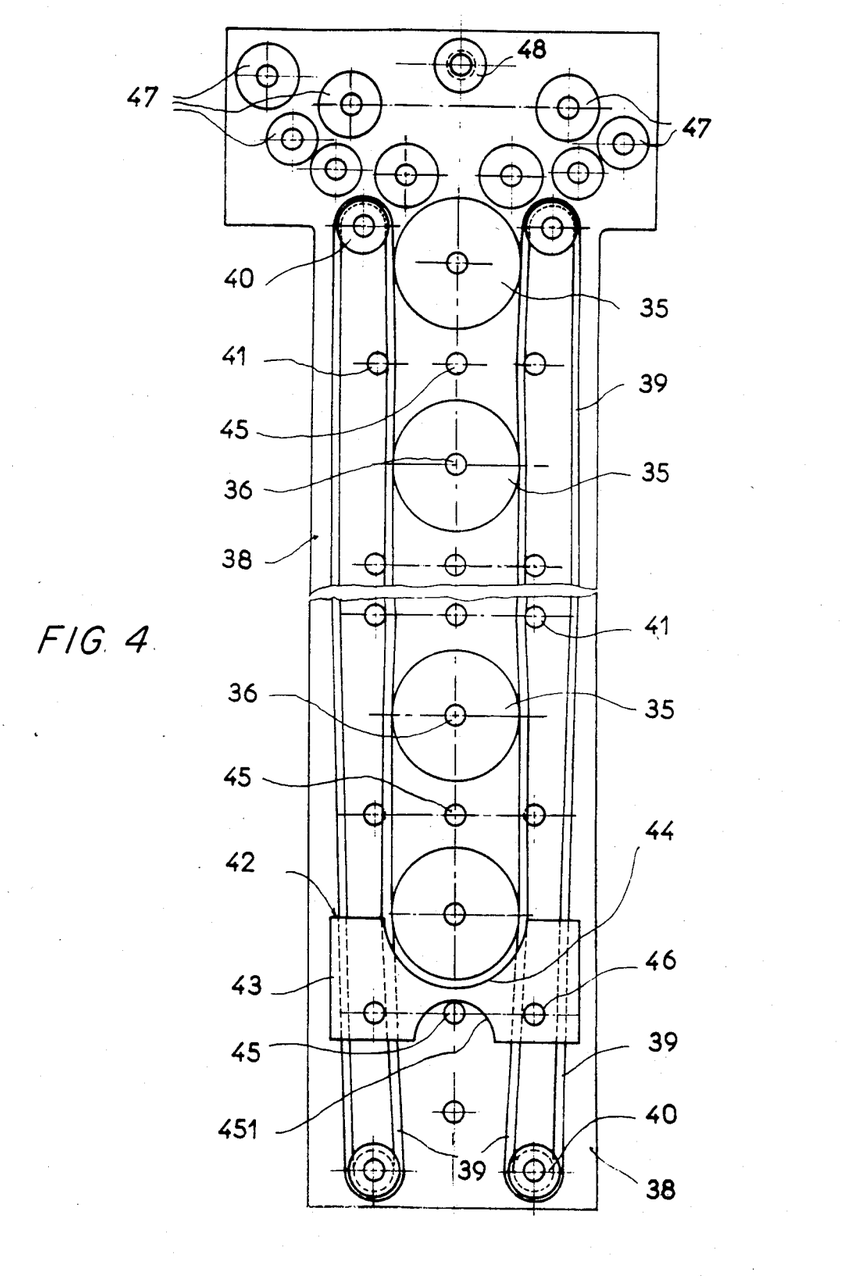
FIG. 4 is a cross-sectional view along plane IV—IV of FIG. 3.

Paper feed means 14 further comprises a semi-circular support element 42 partially surrounding, without being in contact with, last roller 35. Elements 42 are positioned between two series of endless belts 39 and redirect the direction of paper movement in a treatment tank 13. Treatment product in each tank is filled to the level of first roller 35. In each tank the paper follows a path that is substantially "U-"shaped. The semi-circular support forms the links between the decending and ascending path of the paper in each paper feed means 14. According to a preferred embodiment, semi-circular supports 42 are movable on paper feed means 14 and can be positioned readily under each roller 35. This makes it possible to modify the length of the path covered by the paper in the treatment product contained in tank 13, thus making it possible to adjust the time of passage of the paper in the treatment bath. These semi-circular supports comprise a plate 43 in which are provided a semi-circular cutout 44 adapted to surround a roller 35, an opening 45A through which a shaft 45 passes, and two orifices 46 through which attachment rods pass. These attachment rods are fixed in the bearings of cylindrical rods 41 after retraction of these rods.

At the inlets and outlets of paper feed means 14 formed by aperture 34, the paper is guided between two series of parallel rotating shafts 47. One series is positioned to receive substantially vertically received paper from spout 33 with outboard shafts having smaller diameters than the inboard shafts so that the paper travels in an arc as it is conducted to endless bands 39 to begin its passage through the treatment bath. Shafts 47 are mounted in bearings provided in side plates 37 and 38 that preferably form a "T"-shape. The series of shafts at the level of output of the paper can comprise a supplemental shaft 47 such that the paper will exit out of paper feed means substantially perpendicular to the rotation plane of rollers 35.

Paper feed means 14 further comprises on its upper portion and in the vertical plane of rotational rollers 35 a crossbar 48 that can extend beyond both sides of the paper feed means or connect to side plates 37 and 38. This crossbar supports the feed means in tank 13 once it is lowered through aperture 34. It is obvious that the paper feed means 14 are of a sufficient width to accept large format papers and to allow for the lateral distribution of papers substantially on a lateral plane described by the lateral movement of spout 33. The rotating elements of each of paper feed means 14 are driven in rotation by an endless chain 49 activated by motor 50. Endless chain 49 engages each of the paper feed means by at least one pinion 51 attached to a shaft. All of these pinions are at the same height in the paper feed means in developer 12. All of the rotationally driven shafts extend over at least one of the sides of the paper feed means. Movement of endless chain 49 is transmitted through pinion 51 to all of the rotating shafts by a series of gears 52 in each of paper feed means 14. Intermediate gears between the gears on shafts 36 of rollers 35 are carried by shafts 45 to prevent the chain from sagging. Endless chain 53 engages at least two pinions 54 positioned preferably behind the gears of the first and last rollers 35 on the paper-feed means so as to avoid any interference with gears 52.

It is obvious that all elements comprising the paper feed means are resistant to corrosive treatment products.

The paper, after its exposure and cutting, is under the control of the rotating elements of the first paper feed means of developer 12 and is treated by passing through the different tanks 13. Transfer from one tank to another occurs automatically by the series of shafts 47 that are physically close to one another from one feed means to another. The paper is dried at the outlet of the developer. According to a preferred embodiment, drying chamber 15 extends horizontally from the extension of the outlet of the last feed means 14 of developer 12 and is positioned in housing 20 above which is movably mounted projection assembly 1. The drying chamber comprises endless belts 55 stretched between two shafts 56 that are positioned horizontally under rollers 57 rotating in the same horizontal plane and whose rotational axes are perpendicular to belts 55. These belts move horizontally with respect to developer 12. Paper coming out of developer 12 is taken between belts 55 and rollers 57 and is brought towards a sorting table 58. The sorting table preferably comprises an endless belt positioned and adapted to move horizontally in a direction perpendicular to the outlet of drying chamber 15 so that the order of photographs previously modified by displacement of spout 33 above developer 12 is proper.

Endless chain 49 driven by a motor 50 drives belts 55 and rollers 57. Chain 49 engages a pinion 59 integral with one of shafts 56. Movement is transmitted to a roller 57 by gears, and a series of intermediate gears transmits the movement to all of the rollers 57. Drying preferably is achieved by means of ventilation. It is obvious that the movement of the endless belt from sorting table 58 can be associated with the movement of belts 55.

Treatment product reservoir 16 is positioned under drying chamber 15 and housing 20. This reservoir is connected to developer tank 12 by means of pumps (not shown). It is obvious that the present apparatus according to the invention comprises overflow pipes, drainages, and other accessories.

Figure 5:
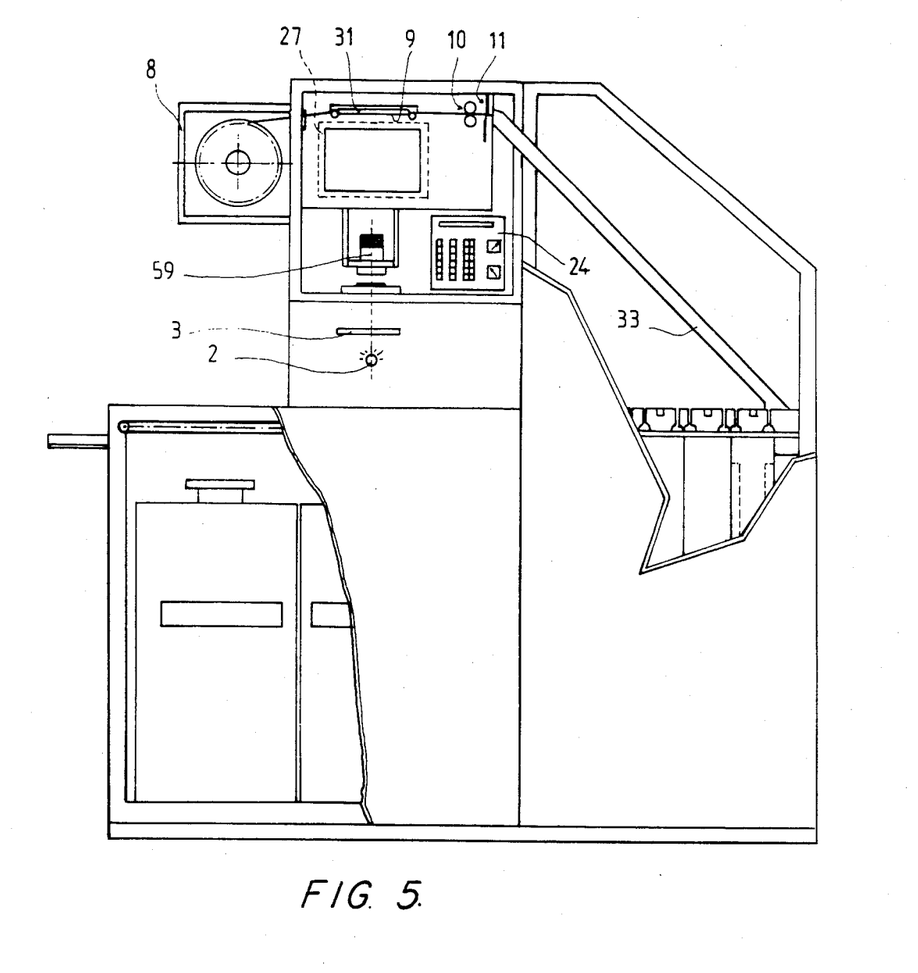
FIG. 5 is a side view, partially broken away of a second embodiment of the present invention.

According to a second embodiment of the invention shown in FIG. 5, the developer/printer apparatus comprises a fixed projection assembly 1 that can be positioned under exposure darkroom 7. Darkroom 7 comprises photosensitive material magazine 8 with spout 33 by which prints falling by gravity are guided to and distributed in developer 12. Developer 12 is positioned against housing 20 containing drying chamber 15 and on which is placed projection assembly 1 and darkroom 7. According to this embodiment, the enlargement of prints is obtained by a "zoom" lens 59 positioned above light source 2, subtractive filters 3, and a negative carrier 4. The light projected through a negative can be projected without being reflected by a mirror directly onto a projection plane. Enlargement and focus are obtained directly by the "zoom" lens that is automatically activated, for example, by a cam driven by a microprocessor. By way of example, the "zoom" lens is of a type commercialized by BETAVARON SCHNEIDER COMPANY. This lens, by being positioned at approximately 650 mm from the projection plane, makes it possible to obtain photographic prints of the format 71 mm×108 mm (3.5" by 4") up to 230 mm×350 mm (9"×14") from a negative of the standard 24 mm×36 mm format type. It is obvious that other elements and characteristics described in the first embodiment of the apparatus are appropriate to the second embodiment.

The present invention makes it possible to automatically obtain prints and enlargements from a negative in an easy and rapid manner. The apparatus is of simple construction and facilitates use. It is obvious that the present invention can receive other improvements and other variations within the domain of technical equivalents without going beyond the scope of the present patent.

What is claimed:

1. An automatic developer/printer apparatus for obtaining photographic prints from a developed negative comprising:
   (a) a projection assembly means for projecting light through a developed negative comprising a negative carrier and an optical apparatus wherein said optical apparatus is displaceable perpendicular to the surface of said negative;
   (b) an exposure darkroom means comprising photosensitive material, wherein said exposure darkroom means exposes said photosensitive material to said light projected through said negative and said optical apparatus wherein said darkroom means further comprises a projection plane comprising means for receiving light projected through said negative and said optical apparatus wherein the entire projection assembly means is displaceable perpendicular to said projection plane;
   (c) a developing means for developing said photosensitive material exposed to said light projected through said negative; and
   (d) a housing wherein said housing comprises a drying chamber for drying said exposed and developed photosensitive material and a treatment product reservoir for storing excess treatment product, wherein said projection assembly means is positioned parallel and adjacent to said exposure darkroom means, said exposure darkroom means is positioned above said developing means, said developing means is positioned parallel and adjacent to said housing, and said housing is positioned under said projection assembly means wherein said projection assembly means, said exposure darkroom means, said developing means and said housing comprise separate elements having separate outer walls, wherein said apparatus further comprises means for displacing said optical apparatus and said projection assembly means in synchronism so as to obtain an enlarged and focused image projected on said projection plane.

2. An automatic developer/printer apparatus defined by claim 1 wherein said projection assembly means comprises:
   (a) at least one light source for projecting light through said negative;
   (b) at least one subtractive filter for filtering light from said light source;
   (c) wherein said negative carrier carries said negative for exposure to said light passing through said subtractive filter;
   (d) a projection chamber wherein said optical apparatus projects said light that is focused through said chamber.

3. An automatic developer/printer apparatus defined by claim 2, wherein said exposure darkroom means comprises:
   (a) at least one magazine of photosensitive material in a strip for exposure to said light that is projected through said projection chamber;
   (b) wherein said light that is projected through said projection chamber is projected onto said projection plane;
   (c) at least one cutting element for cutting said exposed photosensitive material from said strip; and
   (d) at least one means for advancing said photosensitive material in a strip up against and in front of said projection plane.

4. An automatic developer/printer apparatus defined by claim 3 wherein said developing means comprises:
   (a) at least one treatment bath tank that contains development products for developing exposed photosensitive material; and
   (b) at least one means for feeding said photosensitive material through said at least one treatment bath tank.

5. An automatic developer/printer apparatus defined by claim 4 wherein said projection assembly means is movably mounted to said exposure darkroom means perpendicular to said projection plane of said exposure darkroom means, wherein said projection assembly means is mounted on said housing, and wherein said optical apparatus is movably mounted to said projection assembly means perpendicular to said negative carrier, and in synchronism with the displacement of said projection assembly means so as to obtain an enlarged and focused image projected on said projection plane, wherein said image is formed by light passing through said negative and impinging on a surface.

6. An automatic developer/printer apparatus defined by claim 4 wherein said projection assembly means is fixedly mounted on said housing, and wherein said optical apparatus comprises a zoom lens whereby said light that is projected through said negative forms an image, wherein said zoom lens enlarges and focuses said image on said projection plane.

7. An automatic developer/printer apparatus defined by claim 4 wherein said negative carrier is positioned perpendicular to said projection plane and parallel to said direction of displacement of said projection assembly means on said housing, and wherein said optical apparatus is movably mounted to said projection assembly means perpendicular to said direction of displacement of said projection assembly means on said housing.

8. An automatic developer/printer apparatus defined by claim 1 wherein said projection assembly means further comprises a lead screw integral with said housing wherein said projection assembly means is moved horizontally by said lead screw.

9. An automatic developer/printer apparatus defined by claim 4 wherein said projection assembly means further comprises a reflection mirror wherein said reflection mirror is mounted in said projection chamber of said projection assembly means at a 45° angle with respect to said negative carrier so as to reflect said light that is projected through said negative onto said projection plane in said exposure darkroom means, wherein said projection assembly means further comprises a bellows wherein said bellows is mounted at one end to said projection assembly means and at a second end to said exposure darkroom means and said light reflected from said reflection mirror is projected through said bellows onto said projection plane.

10. An automatic developer/printer apparatus defined by claim 4 wherein said negative carrier is mounted rotatably under said optical apparatus so as to obtain at least two enlargement formats on said photosensitive material in said exposure darkroom means.

11. An automatic developer/printer apparatus defined by claim 4 wherein said exposure darkroom means further comprises a means for verifying the focus, the enlargement and the framing of said light that is projected through a negative in at least two enlargement formats on said photosensitive material.

12. An automatic developer/printer apparatus defined by claim 11 wherein said verifying means comprises at least one frosted glass positioned on one of the lateral surfaces of said exposure darkroom means and at least one pivotable mirror mounted in said exposure darkroom means.

13. An automatic developer/printer apparatus defined in claim 4 wherein said at least one means for advancing said photosensitive material advances said photosensitive material after said light reflected from said reflection mirror exposes said photosensitive material.

14. An automatic developer/printer apparatus defined in claim 4, wherein said at least one cutting element cuts said photosensitive material after said photosensitive material has been exposed and advanced and wherein said cut photosensitive material falls below said at least one cutting element in said exposure darkroom means after being cut, wherein said exposure darkroom means further comprises a spout wherein said spout guides said cut photosensitive material towards developing means after said cut photosensitive material falls below said at least one cutting element.

15. An automatic developer/printer apparatus defined in claim 14 wherein said spout moves laterally with respect to said developing means and above said developing means so as to distribute said cut photosensitive material at different points spaced laterally from each other in said developing means.

16. An automatic developer/printer apparatus defined in claim 4 wherein said at least one means for feeding said photosensitive material through said at least one treatment bath tank further comprises parallel cylindrical rollers and endless belts, wherein said rollers rotate in a same plane and said belts are adapted to be displaced linearly with respect to said rollers and perpendicular to the axis of rotation of said rollers, wherein said at least one means for feeding photosensitive material further comprises cylindrical rods wherein said cylindrical rods are loosely mounted parallel to said axis of rotation of said rollers and positioned in a space separating each of said rollers so as to maintain said endless belts against said rollers.

17. An automatic developer/printer apparatus defined by claim 16 wherein said at least one means for feeding photosensitive material further comprises semi-circular supports wherein said semi-circular supports allow for a change in the direction of said cut photosensitive material in said at least one treatment bath tank wherein said semi-circular supports are adapted to be displaced over the entire vertical length of said means for feeding photosensitive material so as to adjust the amount of time said cut photosensitive material is in said treatment bath tank.

18. An automatic developer/printer apparatus defined by claim 16 further comprising a plurality of intermeshing gears for driving said rollers, wherein said feeding means further comprises means for preventing said intermeshing gears from interfering with the working of each other, wherein said preventing means comprises an endless chain and at least two pinions, each integral with one of said rollers and engaging said endless chain.

19. An automatic developer/printer apparatus defined by claim 18 wherein said at least one feeding means further comprises drive means comprising: an endless chain; a pinion integral with one of said rollers; and a drive motor, wherein said drive motor drives said endless chain of said drive means and said endless chain of said drive means drives said pinion, thereby driving said roller integral with said pinion of said drive means.

20. An automatic developer/printer apparatus defined by claim 4 wherein said drying chamber is horizontal with respect to said developing means, and wherein said at least one means for feeding said cut photosensitive material through said at least one treatment bath tank comprises a plurality of feed elements, one of which is adjacent said housing and comprises an outlet having an extension wherein said drying chamber engages said extension of said outlet.

21. An automatic developer/printer apparatus defined by claim 4 wherein said cut photosensitive material is in a particular order in said strip wherein said order of said photosensitive material is altered when passing through said spout in said developer, and wherein said housing further comprises a sorting table wherein said sorting table is positioned adjacent to said drying chamber and comprises an endless belt adapted to be displaced horizontally and perpendicular with respect to said drying chamber so as to reestablish the order of said cut photosensitive material.

22. An automatic developer/printer apparatus for obtaining photographic prints from a developed negative comprising:
(a) a projection assembly means for projecting light through a developed negative;
(b) an exposure darkroom means comprising photosensitive material, wherein said exposure darkroom means exposes said photosensitive material to said light projected through said negative;
(c) a developing means for developing said photosensitive material exposed to said light projected through said negative wherein said developing means comprises at least one treatment bath tank adapted to contain developing products for developing exposed photosensitive material, and at least one means for feeding said photosensitive material through said at least one treatment bath; and
(d) a housing wherein said housing comprises drying chamber for drying said exposed and developed photosensitive material and a treatment product reservoir for storing excess treatment product, wherein said projection assembly means is positioned parallel and adjacent to said exposure darkroom means, said exposure darkroom means is positioned above said developing means, said developing means is positioned parallel and adjacent to said housing, and said housing is positioned under said projection assembly means, wherein said at least one means for feeding photosensitive material further comprises semi-circular supports wherein said semi-circular supports allow for a change in the direction of said cut photosensitive material in said at least one treatment bath tank wherein said semi-circular supports are adapted to be displaced over the entire vertical length of said means for feeding photosensitive material so as to adjust the amount of time said cut photosensitive material is in said treatment bath tank.

23. An automatic developer/printer apparatus defined in claim 22 wherein said at least one means for feeding said photosensitive material through said at least one treatment bath tank further comprises a plurality of parallel cylindrical rollers, at least two shafts, and a plurality of endless belts, wherein each endless belt comprises two end portions each of which extend around one of said shafts, wherein said rollers rotate in a same plane and said belts are adapted to contact said rollers and be displaced linearly with respect to said rollers and perpendicular to the axis of rotation of said rollers, wherein said at least one means for feeding photosensitive material further comprises cylindrical rods wherein said cylindrical rods are loosely mounted parallel to said axis of rotation of said rollers and positioned in a space separating each of said rollers so as to maintain said endless belts against said rollers.

24. An automatic developer/printer apparatus defined by claim 23 further comprising a plurality of intermeshing gears for driving said rollers, wherein said feeding means further comprises means for preventing said intermeshing gears from interfering with the working of each other, wherein said preventing means comprises an endless chain and at least two pinions, each integral with one of said rollers and engaging said endless chain.

25. An automatic developer/printer apparatus for obtaining photographic prints from a developed negative comprising:
(a) a projection assembly means for projecting light through a developed negative to produce an image of said negative;
(b) means for enlarging said image by different amounts;
(c) an exposure darkroom means comprising photosensitive material, wherein said exposure darkroom means exposes said photosensitive material to said light projected through said negative;
(d) a developing means for developing said photosensitive material exposed to said light projected through said negative;
(e) a housing wherein said housing comprises a drying chamber for drying said exposed and developed photosensitive material and a treatment product reservoir for storing excess treatment product, wherein said projection assembly means is positioned parallel and adjacent to said exposure darkroom means, said exposure darkroom means is positioned above said developing means, said developing means is positioned parallel and adjacent to said housing, and said housing is positioned under said projection assembly means;
(f) means for advancing said photosensitive material;
(g) means for cutting said photosensitive material;
(h) means for synchronizing the operation of said enlarging means, said advancing means and said cutting means so that:
 (i) said photosensitive material is advanced only by a length equal to the height of the enlarged image enlarged by any amount by said enlarging means and projected thereon by said projection assembly means; and
 (ii) said cutting means cuts off said advanced length of said photosensitive material.

26. An automatic developer/printer apparatus defined by claim 25 wherein said advancing means advances said photosensitive material at different speeds, wherein said apparatus further comprises:
a spout for directing said cut photosensitive material from said exposure darkroom means to said developing means;
means for laterally displacing said spout at different speeds to divert said cut photosensitive material to different points along the width of said developing means; and
wherein said synchronization means synchronizes the operation of said advancing means, said cutting means, and said spout so that the speed of said spout is a function of the speed of said advancing means.

* * * * *